UNITED STATES PATENT OFFICE.

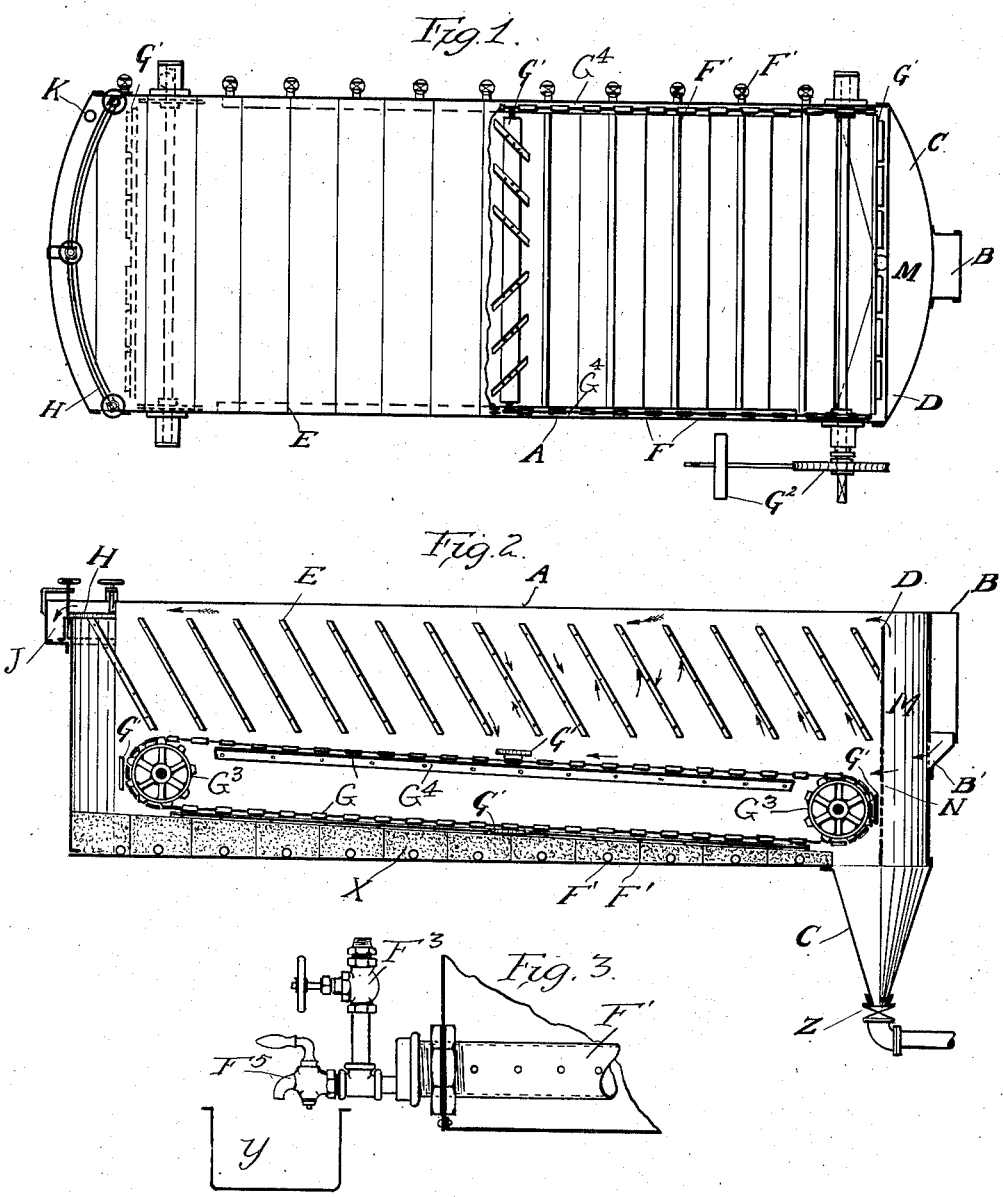

JOHN EDWARD ROTHWELL, OF DENVER, COLORADO, ASSIGNOR TO COLORADO IRON WORKS COMPANY, OF DENVER, COLORADO.

TANK FOR SETTLING, FILTERING, AND COLLECTING SOLIDS FROM LIQUIDS.

976,923.

Specification of Letters Patent. Patented Nov. 29, 1910.

Application filed June 17, 1909. Serial No. 502,739.

*To all whom it may concern:*

Be it known that I, JOHN E. ROTHWELL, citizen of the Dominion of Canada, residing at Denver, Colorado, have invented certain new and useful Improvements in Tanks for Settling, Filtering, and Collecting Solids from Liquids, of which the following is a specification.

My invention relates to plants for the treatment of ore and particularly to an apparatus for the separation of liquid and solids, so that either one or both may be subjected to a subsequent treatment when so separated. In such plants in which a part of the operation is performed by the wet process, as with water or a cyanid solution, it is sometimes necessary to reduce the ratio of liquid and solid, so that either or both may be in proper condition for further treatment, and my invention is designed to provide an apparatus for this purpose.

The invention consists in the features and combination and arrangement of parts hereafter described and particularly pointed out in the claims.

In the accompanying drawings, Figure 1 is a plan view of the apparatus with a portion of the baffle plates broken away to show the lower structure; Fig. 2 is a central vertical sectional view of the invention. Fig. 3 is a detail view.

The apparatus comprises a tank A into which the liquid containing the solids is fed continuously at one end, at a point some distance below the top, and is caused to pass to the other end of the tank, the separation of the solids from the liquid taking place during the time the liquid is moving from the inlet end to the discharge end of the tank, the solids settling to the bottom, the clear liquid overflowing an adjustable weir at the discharge end of the tank. The tank is preferably rectangular in form. At its feed end it is provided with a feed box B, the inlet B' from which into the tank is located about midway the height of the tank, at which point perforations are made in the tank wall. The liquid bearing the solids passing through these perforations enters first a settling chamber M formed between the end wall of the tank and the diaphragm or partition D arranged vertically and terminating at its upper edge slightly below the top edge of the tank to allow for the flow of the liquid thereover into the main body of the tank. While the upper part of this partition is solid, the lower part is perforated at N. Below the settling chamber M is a collecting receptacle C tapering downwardly and provided at its lower end with a gate or valve Z. The larger upper end of the collecting receptacle communicates freely with the settling chamber M on one side of the partition D, and with the main chamber of the tank on the other side of the said partition. Within the main chamber of the tank baffle plates E extend across at an angle of about 60° or at the desired inclination to prevent solids which settle thereon from adhering thereto. The top edges of the baffle plates lie in a horizontal plane slightly below the top of the tank, and the lower edges in a plane about one-half the depth of the tank.

Transverse partitions F subdivide the bottom of the tank into independent sections, containing a filtering material, and in each of said sections a perforated pipe F' is placed, which passes through the side of tank at the bottom, and to the outer end of which are attached suitable valves and fittings. The pipe F is perforated with small apertures along its length for collecting the filtrate and also to permit of reversing the flow for washing the filtering media X in the separate compartments formed by the partitions.

A double chain scraper conveyer G is submerged at the bottom of the tank and passes around the sprocket wheels $G^3$, so that the scraper flights G' move along the surface of the filter media toward the collecting receptacle C. The upper part of the chains and scraper returns over the top of the wheels toward the overflow end of the tank, and the chains are supported on flanges or shelves $G^4$ attached to the sides of the tank. The speed of this chain traveling from end to end of the tank is very slow, in practice, about 2 lineal feet per minute, and therefore it does not have a tendency to agitate the solids settling to the surface of the filter. A suitable mechanism $G^2$ is used to operate the scraper conveyer.

An adjustable weir H is located at the overflow end of the tank, arranged to raise and lower mechanically, such as with rods and hand wheel, in order to regulate the height of the liquid standing in the tank above the baffle plates.

An overflow launder J for the clear liquid or solution, freed from solids, is located across the end of the tank, and collects the liquid overflowing the weir and delivers it through the opening K to any desired point for after treatment.

The operation of this apparatus is as follows: The fine solid matter suspended in a large proportion of liquid is delivered to the feed box at B and passes into the tank through the small apertures shown at B'; the tendency of these small openings is to distribute the material passing through over a larger area; after passing these openings it passes into the settling chamber M where it meets the partly perforated and partly imperforate partition D. In practice the heavier solids settle directly into the collecting receptacle C, a portion of the lighter solids rise to the top of the partition D and overflow, the heavier of the lighter solids pass through the perforations at N and move along the length of the tank below the baffles, and gradually settle onto the filter surface, and are gently moved back to the receptacle C by the scraper conveyer. The inclined baffles are used to retard the flow of the lighter solids and provide a space free from agitating currents. For instance, the liquid carrying the fine solids flows slowly over the top of the baffle plates, and any solids that have settled below the top edge of the baffle plate are retained in that section and settles down along the upper surface of the baffle, undisturbed; the displacement occurring by the settlement of this solid rises along the underside of the adjacent inclined baffle plate. Another function of the inclined baffle is to practically increase the settling area of the tank.

The filter is designed to increase the working capacity of the tank. The whole of the liquid entering the tank can be drawn through the filter, if desired, thus assisting the settling quality of the solids, or the overflow weir can be raised to a height to prevent the discharge of liquid at this point except as a means to prevent the overflowing of the tank.

The filter bed is inclined upwardly from the feed end toward the overflow end, in order to get a deeper bed of filtering media where the finer solids will settle. The subdivision of the filter bed into separate compartments, each with its own perforated pipe, is to permit of each separate filter section being operated independently and to be able to wash or cleanse the filtering media by reversing the flow of liquid through the perforated pipe. Thus in practice the fine solids settle in a compact mass on the surface of the filtering media and becomes practically impervious. When this occurs the outlet valve of the perforated pipe is closed and an inflow valve opened, permitting a flow of liquid or air back through the pipe and upward through the filtering media. This upward current lifts the compact mass of fine settled pulp from the surface of the media and the movement of the scrapers of the submerged conveyer carries the solid to the discharge end and collecting receptacle. The collecting receptacle C is conical or pyramidal in form. The gate Z is to permit the control of the flow therefrom continuously or intermittently, as required by the after treatment.

Fig. 3 shows on inflow valve at $F^3$, one of these being in connection with each perforated pipe F' in the bottom of the filter bed, to which valve any suitable hose connection may be made to induct an air or liquid into the pipe F' for washing the filter medium X. $F^5$ is a valve to control the outflow of the filtrate, and Y is a launder. In operation the filtrate will be drawn through the valves $F^5$ until the filter medium becomes clogged and the flow reduced, then the valve $F^5$ will be closed and a hose attached to the valve $F^3$ and the cleansing liquid or air admitted to the pipe F', and this action may be carried out in connection with all of the pipes when necessary.

I claim as my invention:—

1. In combination with a settling tank, a perforated partition near the feed end thereof for retarding and distributing the mixture of solids and liquid to be separated, said partition having an overflow at its top, substantially as described.

2. In combination with a settling tank, a partition forming a settling chamber and a collecting receptacle below and communicating with said settling chamber, said partition having an overflow, and a conveyer operating in the main part of the tank to deliver the solids to the collecting receptacle, substantially as described.

3. In combination with a settling tank, a partition forming a settling chamber near the feed end having an underflow and an overflow, a collecting receptacle communicating with said settling chamber and with the main chamber of the tank, and a conveyer in the main chamber to deliver the solids to the collecting receptacle, substantially as described.

4. In combination with a settling tank, baffles therein at the upper part thereof, means for maintaining a water level at or near the top of the said baffles, and inlet means for the mixed liquid and solid at a point below the water level, substantially as described.

5. In combination in a settling tank, a partition near the inlet end having a perforated lower part and an imperforate upper part terminating below the top of the tank to permit the lighter material and liquid to pass thereover, baffles at the upper part of the main chamber of the tank, a scraping conveyer operating along the bottom of the tank and a collecting receptacle communicating with the main tank and with the settling chamber formed by the said partition, substantially as described.

6. In combination in a settling tank, a partition near the inlet end having a perforated lower part and an imperforate upper part terminating below the top of the tank, and conveying means at the bottom of the tank, substantially as described.

7. A settling tank having an inlet at one end and an outlet at the other, and a series of baffle plates arranged at the top of the tank in inclined position and slightly below the outlet to allow overflow at their top, all of said baffles being above the bottom of the tank with a free space beneath them from end to end of the tank, substantially as described.

8. In combination with a settling tank, a series of baffle plates at the upper part thereof inclining upwardly and in a direction from the inlet to the outlet end of the tank, and submerged for overflow, all of said baffle plates being above the bottom of the tank with a free space beneath them from end to end of the tank, substantially as described.

9. A settling tank having an inlet at one end and an outlet at the other between which the liquid flows substantially horizontally, and a series of baffles in the upper part of the tank below the surface of and in the course of the flow of the liquid, said baffles having a free space beneath them from end to end of the tank, substantially as described.

10. A settling tank having an inlet at one end and an outlet at the other between which the liquid flows substantially horizontally, and a series of baffles in the upper part of the tank in the course of the flow of the liquid, a collecting receptacle near the inlet end of the tank and a conveyer at the bottom of the tank for moving the settled material from the outlet end of the tank to the collecting receptacle, substantially as described.

11. A settling tank having a series of compartments along its bottom containing filtering material and a perforated pipe in each compartment for draining off the filtrate or for washing the filtering material, substantially as described.

12. In combination in a settling tank, a filter bed at the bottom thereof and a scraper conveyer operating thereover, substantially as described.

13. A settling tank having a filter bed with a pipe or pipes embedded therein for washing the filtering medium, and a scraper moving over the filter bed, substantially as described.

14. A settling tank having a horizontal flow from inlet to outlet, baffle plates at the top of the tank in the course of said flow, and an adjustable weir at the discharge end of the tank, substantially as described.

15. A settling tank having a vertical partition near the inlet end with a perforated lower part and an imperforate upper part terminating below the top of the tank for the overflow of the lighter material, and a conveyer at the lower part of the tank, substantially as described.

16. A settling tank having a substantially vertical partition at one end forming a settling chamber between itself and the wall of the tank, the lower part being perforated and the upper part imperforate, and terminating at a point below the top of the tank, a collecting chamber below the settling chamber, and communicating therewith and also with the main tank, said settling and collecting chambers being at the inlet end of the tank, substantially as described.

17. A settling tank having an inlet and an outlet between which the material passes substantially horizontally, an inclined filter bed inclining upwardly from the inlet toward the outlet end of the tank, and a conveyer moving over said filter bed, substantially as described.

18. A settling tank having a filter bed divided up into sections with dividing walls between, and pipes in said sections, substantially as described.

19. In combination the settling tank, baffles therein, and outlets distributed over the bottom for drawing off the liquid at different points, and a conveyer at the bottom of the tank, substantially as described.

20. In combination a settling tank having an inlet at one end and an outlet at the other end, porous material at the bottom, said material being subdivided into a number of separate transverse compartments, and an outlet from each individual compartment for drawing off the liquid, and valves for controlling the said outlets, substantially as described.

21. In combination, a settling tank, a filter bed at the bottom thereof, outlets for drawing off the liquid at different points through the said bed, and a conveyer, substantially as described.

22. In combination in a settling tank, a partition near the inlet having an overflow and an underflow, and forming a settling chamber, a collecting receptacle communicating with both the settling chamber and with the main part of the tank, and a conveyer at the bottom of the tank, substantially as described.

23. In combination in a settling tank, a vertical partition near the inlet having an upper inperforate portion and a lower perforated portion, said partition being submerged for the flow of the material over its upper edge, and a collecting chamber communicating with the main part of the tank and with the portion divided off therefrom by the said partition, the inlet to the tank being substantially midway of the height thereof and of the partition, substantially as described.

24. In combination a tank having an inlet at about midway of its height at one end, a partition extending vertically of the tank near the inlet end, the upper part of the partition being imperforate and submerged, and the lower part of the partition being perforated, substantially as described.

In testimony whereof, I affix my signature in presence of two witnesses.

JOHN EDWARD ROTHWELL.

Witnesses:
F. D. Gross,
H. H. Galbraith.